(12) United States Patent
Okubo et al.

(10) Patent No.: US 11,929,489 B2
(45) Date of Patent: Mar. 12, 2024

(54) ELECTRODE PLATE AND MANUFACTURING METHOD FOR ELECTRODE PLATE

(71) Applicants: Prime Planet Energy & Solutions, Inc., Tokyo (JP); TOYOTA JIDOSHA KABUSHIKI KAISHA, Aichi-ken (JP)

(72) Inventors: Sokichi Okubo, Okazaki (JP); Tomoyuki Uezono, Okazaki (JP); Momoka Miyajima, Toyota (JP); Nagisa Shimasaki, Nagoya (JP); Masaki Watanabe, Seto (JP); Miyuki Matsuyama, Toyota (JP)

(73) Assignees: PRIME PLANET ENERGY & SOLUTIONS, INC., Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/592,455

(22) Filed: Feb. 3, 2022

(65) Prior Publication Data

US 2022/0271270 A1 Aug. 25, 2022

(30) Foreign Application Priority Data

Feb. 24, 2021 (JP) .................................. 2021-027510

(51) Int. Cl.
*H01M 4/139* (2010.01)
*H01M 4/04* (2006.01)
(Continued)

(52) U.S. Cl.
CPC ......... *H01M 4/139* (2013.01); *H01M 4/0404* (2013.01); *H01M 4/043* (2013.01);
(Continued)

(58) Field of Classification Search
CPC ....... Y02E 60/10; H01M 4/043; H01M 4/668; H01M 4/0435; H01M 4/048; H01M 4/139;
(Continued)

(56) References Cited

U.S. PATENT DOCUMENTS

2005/0064289 A1\* 3/2005 Suzuki .................. H01M 4/139
252/182.1
2009/0191460 A1 7/2009 Fujiwara et al.
(Continued)

FOREIGN PATENT DOCUMENTS

CN 101499524 A 8/2009
CN 111477841 A 7/2020
(Continued)

*Primary Examiner* — Tabassom Tadayyon Eslami
(74) *Attorney, Agent, or Firm* — HAUPTMAN HAM, LLP (57) ABSTRACT

A manufacturing method for an electrode plate and an electrode plate are provided. The method includes deposition-layer forming to form a deposition layer in which active material particles and binder particles are deposited on a surface of a current collecting foil and heat pressing to form an electrode layer on the surface of the current collecting foil by heating and compressing a deposition-layer-formed current collecting foil having the deposition layer on the surface of the current collecting foil. The deposition layer includes a first deposition layer placed on a side of the current collecting foil and a second deposition layer constituting a surface of the deposition layer. The deposition-layer forming includes forming the deposition layer in which a content rate of the binder particles in the second deposition layer is lower than a content rate of the binder particles in the first deposition layer.

3 Claims, 5 Drawing Sheets

(51) Int. Cl.
 *H01M 4/36* (2006.01)
 *H01M 10/0525* (2010.01)

(52) U.S. Cl.
 CPC ......... *H01M 4/0471* (2013.01); *H01M 4/366* (2013.01); *H01M 10/0525* (2013.01)

(58) Field of Classification Search
 CPC .. H01M 4/04; H01M 4/803; H01M 2004/028; H01M 4/13; H01M 4/0404; H01M 4/366
 See application file for complete search history.

(56) References Cited

U.S. PATENT DOCUMENTS

| | | | |
|---|---|---|---|
| 2014/0030590 A1* | 1/2014 | Wang | H01M 4/366 977/734 |
| 2017/0324097 A1 | 11/2017 | Lee et al. | |
| 2019/0139714 A1* | 5/2019 | Shin | H01M 4/366 |
| 2020/0144591 A1* | 5/2020 | Wang | B05D 3/007 |
| 2020/0295353 A1 | 9/2020 | Tanaka | |
| 2022/0190309 A1 | 6/2022 | Uezono et al. | |

FOREIGN PATENT DOCUMENTS

| | | | |
|---|---|---|---|
| CN | 111697195 A | | 9/2020 |
| JP | 2008258055 A | | 10/2008 |
| JP | 201362105 A | | 4/2013 |
| JP | 2013062105 | * | 4/2013 |
| JP | 2013191415 A | | 9/2013 |
| JP | 2015201334 A | | 11/2015 |
| JP | 2017204468 A | | 11/2017 |
| JP | 2018147790 A | | 9/2018 |
| JP | 202068113 A | | 4/2020 |
| JP | 202293920 A | | 6/2022 |

* cited by examiner

ELECTRODE PLATE AND MANUFACTURING METHOD FOR ELECTRODE PLATE

CROSS-REFERENCE TO RELATED APPLICATIONS

This application is based upon and claims the benefit of priority from the prior Japanese Patent Application No. 2021-027510 filed on Feb. 24, 2021, the entire contents of which are incorporated herein by reference.

BACKGROUND

Technical Field

The present disclosure relates to an electrode plate and a manufacturing method for the electrode plate.

Related Art

Heretofore, as an electrode plate, an electrode plate including an electrode layer formed on a surface of a current collecting foil has been known. A manufacturing method for this type of the electrode plate has been known as a technique disclosed in JP2020-068113A, for example.

Firstly, in a deposition-layer forming process, a deposition layer, in which active material particles and binder particles are deposited on a surface of a current collecting foil and no solvent is included, is formed. Specifically, there is prepared an apparatus provided with a roller A and a roller B rotating to face each other and configured such that the current collecting foil is conveyed by the roller B by passing through a gap between the roller A and the roller B to dispose a mixed powder body, in which the electrode active material particles and the binder particles are mixed and no solvent is included, on the surface of the current collecting foil. To be in more detail, the mixed powder body is serially supplied to an outer circumferential surface of the roller A in a state that an electric potential difference is generated between the roller A and the current collecting foil conveyed by the roller B, and then there is further generated the electric potential difference between the current collecting foil and the mixed powder body supplied to the outer circumferential surface of the roller A. Owing to the thus generated electric potential difference, the mixed powder body is moved from the outer circumferential surface of the roller A to a surface of the current collecting foil by an electrostatic force exerted between the mixed powder body and the current colleting foil, thereby serially disposing the mixed powder body on the surface of the current collecting foil which is being conveyed by the roller B. Thus, the deposition layer in which the active material particles and the binder particles are deposited and no solvent is included is formed on the surface of the current collecting foil.

Thereafter, in a heat pressing process, the deposition-layer-formed current collecting foil having the deposition layer on the surface thereof is heated and compressed by a pair of heat pressing portions of a heat pressing device to form an electrode layer on the surface of the current collecting foil. Specifically, the deposition-layer-formed current collecting foil is made to pass (to be applied with heating-roller pressing) between a pair of heating rollers (a first heating roller and a second heating roller) as the pair of the heat press portions, and thus the deposition layer is compressed in its thickness direction and the binder particles included in the deposition layer are softened and molten. By the thus softened and molten binder particles, the active material particles are bound to one another and the deposition layer is bound to the surface of the current collecting foil. As a result of this, the deposition layer becomes the electrode layer and the electrode layer is formed on the surface of the current collecting foil.

SUMMARY

Technical Problems

In the above-mentioned manufacturing method, when the electrode layer is formed on the surface of the current collecting foil by heating and compressing the deposition-layer-formed current collecting foil in the heat pressing process, a surface of the deposition layer is increased its adhesion due to the softened or molten binder particles existing on the surface of the electrode layer (the deposition layer), and thus the surface of the electrode layer sometimes adheres (sticks) to the heat press portion (the first heating roller with which the surface of the deposition layer is contacted). Further, when the surface of the electrode layer is to be separated from the heat press portion (the first heating roller with which the surface of the deposition layer is contacted), a part of the electrode layer could be detached (peeled off) from the surface of the current collecting foil and adheres (is transferred) to the heat press portion (the heat press portion with which the surface of the deposition layer is contacted) of the heat pressing device. Furthermore, there has been a demand for an electrode plate achieving improvement in the charge and discharge characteristics of a battery.

The present disclosure has been made in view of the above situation and has a purpose of providing a manufacturing method for an electrode plate that can reduce the problem that "a part of an electrode layer is detached (peeled off) from a surface of a current collecting foil and adheres (is transferred) to a heat press portion of a heat pressing device," and an electrode plate achieving improvement in the charge and discharge characteristics of a battery.

Means of Solving the Problems

One aspect of the present disclosure is a manufacturing method for an electrode plate including an electrode layer on a surface of a current collecting foil, the method comprising: deposition-layer forming of forming a deposition layer, in which a plurality of active material particles and a plurality of binder particles are deposited and no solvent is included, on the surface of the current collecting foil; and heat pressing of forming the electrode layer on the surface of the current collecting foil by heating and compressing a deposition-layer-formed current collecting foil, in which the deposition layer exists on the surface of the current collecting foil, by use of a pair of heat press portions of a heat pressing device, wherein the deposition layer includes a first deposition layer placed on a side of the current collecting foil and a second deposition layer constituting a surface of the deposition layer, the deposition layer is formed in the deposition-layer forming such that a content rate of the binder particles in the second deposition layer is lower than the content rate of the binder particles in the first deposition layer.

According to the above-mentioned manufacturing method, in the deposition-layer forming, the deposition layer, in which the active material particles and the binder particles are deposited and no solvent is included, is formed on the surface of the current collecting foil. The deposition layer includes the first deposition layer placed on the side of the current collecting foil and the second deposition layer constituting the surface of the deposition layer. As the first deposition layer, a layer to be in contact with the surface of the current collecting foil can be given as an example. Further, as the second deposition layer, a layer deposited on a surface of the first deposition layer to form a surface of the deposition layer can be given as an example.

Further, in the above-mentioned manufacturing method, thereafter, in the heat pressing, the deposition-layer-formed current collecting foil having the deposition layer formed on the surface of the current collecting foil is heated and compressed by the pair of the heat press portions of the heat pressing device to form the electrode layer on the surface of the current collecting foil. In the heat pressing, the deposition layer is compressed in its thickness direction and the active material particles are bound to one another by the softened or molten binder particles so that the deposition layer is bound to the surface of the current collecting foil. Accordingly, the deposition layer becomes the electrode layer, and the electrode layer is formed on the surface of the current collecting foil.

Incidentally, in the above-mentioned manufacturing method, in the deposition layer forming, the deposition layer is formed in a manner that the content rate of the binder particles in the second deposition layer (the layer as a part of the deposition layer constituting the surface of the deposition layer) is lower than the content rate of the binder particles in the first deposition layer (the layer as a part of the deposition layer placed on the side of the current collecting foil). Accordingly, in the heat pressing, the second deposition layer having relatively low content rate in the binder particles of the deposition layer is to be in contact with the heat press portions of the heat pressing device. Thus, in the heat pressing, the surface of the deposition layer is hard to adhere (stick) to the heat press portions, and accordingly it is possible to reduce the problem that "a part of the electrode layer is detached (peeled off) from the surface of the current collecting foil and sticks (is transferred) to the heat press portions of the heat pressing device."

As the heat pressing device, there is given a heat pressing device including a pair of heating rollers (a first heating roller and a second heating roller) configured such that the deposition-layer-formed current collecting foil is made to pass between the first heating roller and the second heating roller to heat and compress (heat roll-pressing) the deposition-layer-formed current collecting foil, for example. The pair of the heat press portions of this heat pressing device are the first heating roller and the second heating roller.

Further, as the heat pressing device, there is given a heat pressing device including a pair of heating plates (a first heating plate and a second heating plate) configured such that the deposition-layer-formed current collecting foil is held between the first heating plate and the second heating plate to heat and compress the deposition-layer-formed current collecting foil, for example. The pair of the heat press portions of this heat pressing device are the first heating plate and the second heating plate. Furthermore, the deposition layer and the electrode layer may include conductive particles such as acetylene black in addition to the active material particles and the binder particles.

Further, in the above-mentioned manufacturing method for the electrode plate, preferably, the deposition-layer-forming includes: forming the first deposition layer formed of first composite particles in which the binder particles having smaller diameter than the active material particles are bound to surfaces of the active material particles and no solvent is included; forming the second deposition layer formed of at least any one of the active material particles and second composite particles in which less binder particles than those included in the first composite particles are bound to the surfaces of the active material particles and no solvent is included.

In the above-mentioned manufacturing method, in the deposition-layer forming, there is formed the first deposition layer formed of the first composite particles, in which the binder particles having the diameter smaller than the active material particles are bound to the surfaces of the active material particles. Further, there is formed the second deposition layer formed of at least any one of the active material particles (the active material particles to which no binder particles are bound) and the second composite particles in which the binder particles less than those included in the first composite particles are bound to the surfaces of the active material particles. Therefore, the number of the binder particles existing around the active material particles included in the second deposition layer is less than the number of the binder particles existing around the active material particles in the first deposition layer.

Accordingly, in the heat pressing, the second deposition layer having relatively less number of binder particles around the active material particles in the deposition layer is to be in contact with the heat press portions of the heat pressing device. Thus, in the heat pressing, the active material particles contacted with the heat press portions are hard to adhere (stick) to the heat press portions, and accordingly it is possible to reduce the problem that "a part of the electrode layer is detached (peeled off) from the surface of the current collecting foil to stick (be transferred) to the heat press portions of the heat pressing device."

Herein, the first composite particles and the second composite particles are particles in which the binder particles having the smaller diameters than the active material particles are bound to the surfaces of the active material particles and no solvent (liquid) is included. Specifically, the first composite particles and the second composite particles are particles in which at least a plurality of the binder particles are bound to the surfaces of the active material particles, and the composite particles may be the particles in which conductive particles such as acetylene black other than the binder particles are bound to the surfaces of the active material particles.

Another aspect of the present disclosure is an electrode plate comprising: a current collecting foil; and an electrode layer provided with a plurality of active material particles and a plurality of binder particles and formed on a surface of the current collecting foil, wherein the electrode layer includes a first electrode layer placed on a side of the current collecting foil and a second electrode layer constituting a surface of the electrode layer, and a content rate of the binder particles in the second electrode layer is lower than the content rate of the binder particles in the first electrode layer.

In the above-mentioned electrode plate, the electrode layer includes the first electrode layer placed on the side of the current collecting foil and the second electrode layer constituting the surface of the electrode layer. As the first electrode layer, a layer contacted with the surface of the current collecting foil can be given as an example. Further, as the second electrode layer, a layer placed (laminated) on the surface of the first electrode layer to constitute the surface of the electrode layer can be given as an example.

Further, in the above-mentioned electrode plate, the content rate of the binder particles in the electrode layer is less in the second electrode layer constituting the surface of the electrode layer than in the first electrode layer placed on the side of the current collecting foil. Thus, reduction in the content rate of the binder particles on the surface-side of the electrode layer leads to improvement in the charge and discharge characteristics in a battery. For example, when the above-mentioned electrode plate is used as an electrode plate (a positive electrode plate or a negative electrode plate) of a lithium-ion secondary battery, there is less binder particles which obstruct coming in and out (insertion and detachment) of lithium ions on the surface of the electrode layer, and thus the lithium ions are easy to come in and out (insertion and detachment) of the surface of the electrode layer. Accordingly, the charge and discharge characteristics of the lithium-ion secondary battery is improved.

Further, the above-mentioned electrode plate is, preferably, the electrode layer is formed such that the active material particles are bound by the binder particles having smaller diameters than those of the active material particles, and the number of the binder particles existing around the active material particles included in the second electrode layer is less than the number of the binder particles existing around the active material particles included in the first electrode layer.

In the above-mentioned electrode layer of the electrode plate, a plurality of the active material particles are bound to one another via the binder particles having the smaller diameter than the active material particles. Then, in this electrode layer, the number of the binder particles existing around the active material particles in the second electrode layer (the layer constituting the surface of the electrode layer) is less than the number of the binder particles existing around the active material particles in the first electrode layer (the layer placed on the side of the current collecting foil).

In this manner, reduction in the number of the binder particles around the active material particles on the surface-side of the electrode layer leads to improvement in the charge and discharge characteristics of a battery. For example, when the above-mentioned electrode plate is used as an electrode plate (a positive electrode plate or a negative electrode plate) of a lithium-ion secondary battery, there are less binder particles which obstruct coming in and out (insertion and detachment) of the lithium ions in the active material particles existing on the surface of the electrode layer, and thus the lithium ions are easy to come in and out (insertion and detachment) of the surface of the electrode layer. Accordingly, the charge and discharge characteristics of the lithium-ion secondary battery is improved.

DETAILED DESCRIPTION OF THE EXEMPLARY EMBODIMENTS

An embodiment embodying the present disclosure is now explained in detail below with reference to the accompanying drawings. The present embodiment applies the present disclosure to a negative electrode plate for a lithium-ion secondary battery and manufacturing of the negative electrode plate for the lithium-ion secondary battery. Specifically, in the present embodiment, the negative electrode plate for the lithium-ion secondary battery is exemplified as an electrode plate and a manufacturing method for the negative electrode plate of the lithium-ion secondary battery is exemplified as a manufacturing method for an electrode plate.

Firstly, a negative electrode plate 100 according to the embodiment is explained. The negative electrode plate 100 is provided with a current collecting foil 110 including a first surface 110b and a second surface 110c and an electrode layer 120 formed on a surface (the first surface 110b) of this current collecting foil 110 (see FIG. 1). The electrode layer 120 includes a plurality of active material particles 121 and a plurality of binder particles 122. This electrode layer 120 includes a first electrode layer 120A placed on a side of the current collecting foil 110 and a second electrode layer 120B constituting a surface 125 of the electrode layer 120. The first electrode layer 120A and the second electrode layer 120B each include a plurality of the active material particles 121 and a plurality of the binder particles 122.

Figure 1:
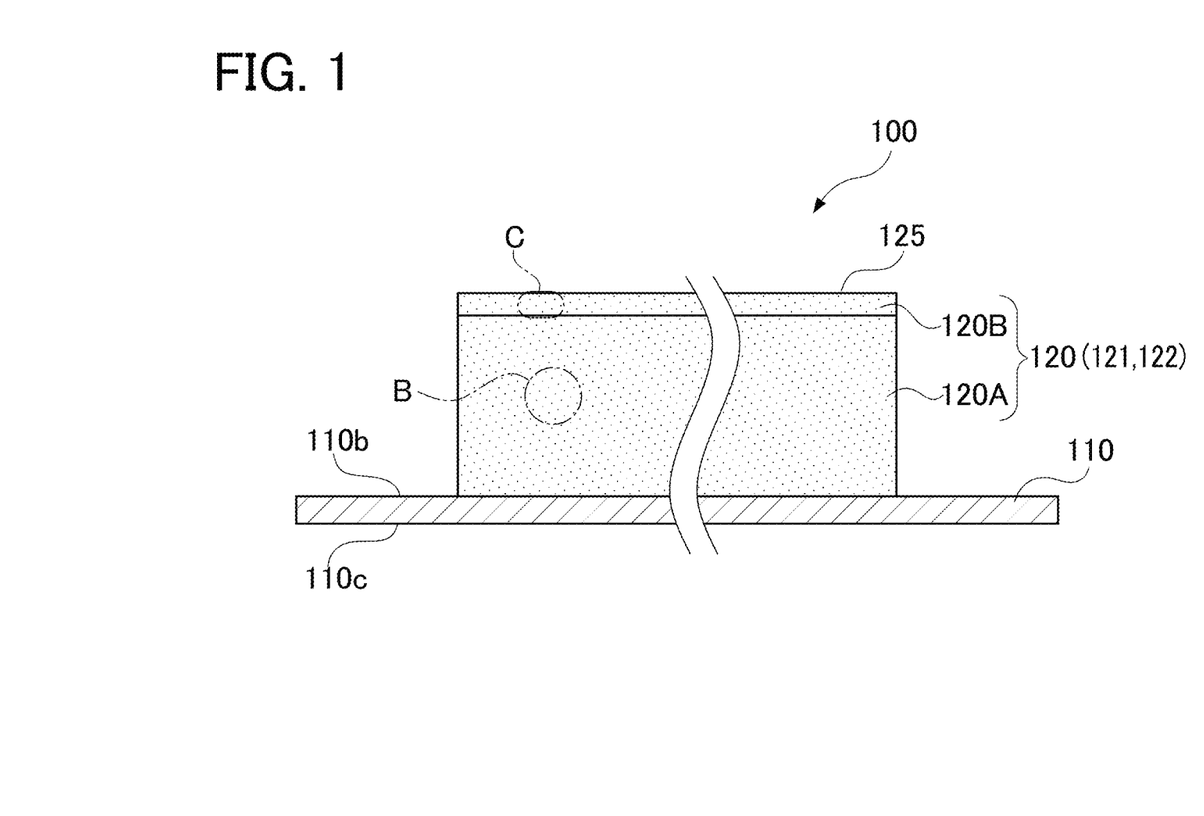
FIG. 1 is a schematic sectional view of an electrode plate in the embodiment.

In the present embodiment, the first electrode layer 120A is a layer contacted with the surface (the first surface 110b) of the current collecting foil 110 and the second electrode layer 120B is a layer placed (laminated) on a surface of the first electrode layer 120A. Further, as the current collecting foil 110, a copper foil of a thickness of 8 μm is used, and as the active material particles 121, graphite particles with a grain diameter of 10 μm are used in the present embodiment. Furthermore, as the binder particles 122, PVDF particles with a grain diameter of 100 to 200 nm are used.

In the negative electrode plate 100 of the present embodiment, a content rate of the binder particles 122 in the electrode layer 120 is lower in the second electrode layer 120B constituting the surface 125 of the electrode layer 120 than the first electrode layer 120A placed on the side of the current collecting foil 110. In the electrode layer 120, the content rate of the binder particles 122 on the surface 125 side (the surface 125) is thus made lower, so that the charge and discharge characteristics can be made preferable in a lithium-ion secondary battery. Specifically, there are less binder particles 122 which would obstruct coming in and out (insertion and detachment) of lithium ions on the surface 125 of the electrode layer 120, and thus the lithium ions are easy to come in and out (insertion and detachment) of the surface 125 of the electrode layer 120. As a result of this, the charge and discharge characteristics of the lithium-ion secondary battery is improved.

Figure 2:
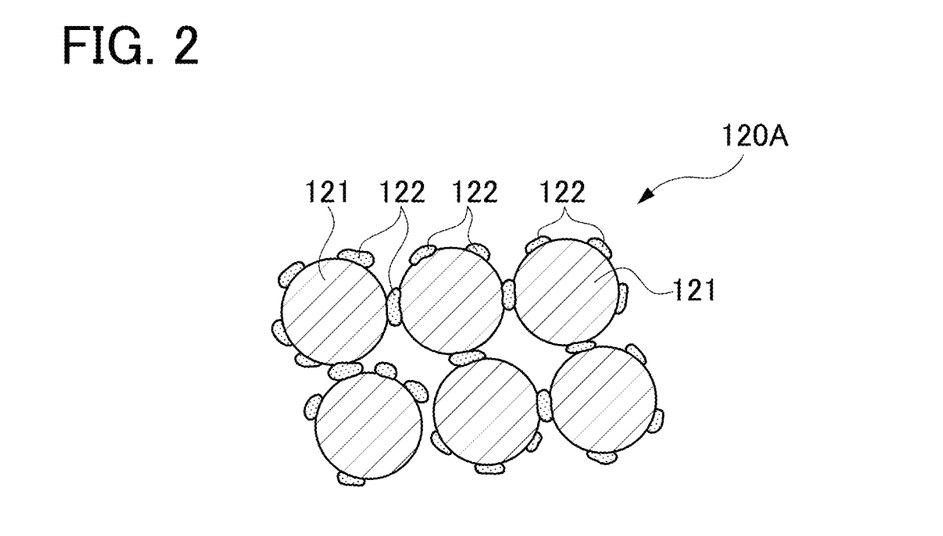
FIG. 2 is an enlarged view of a part B in FIG. 1.
Figure 3:
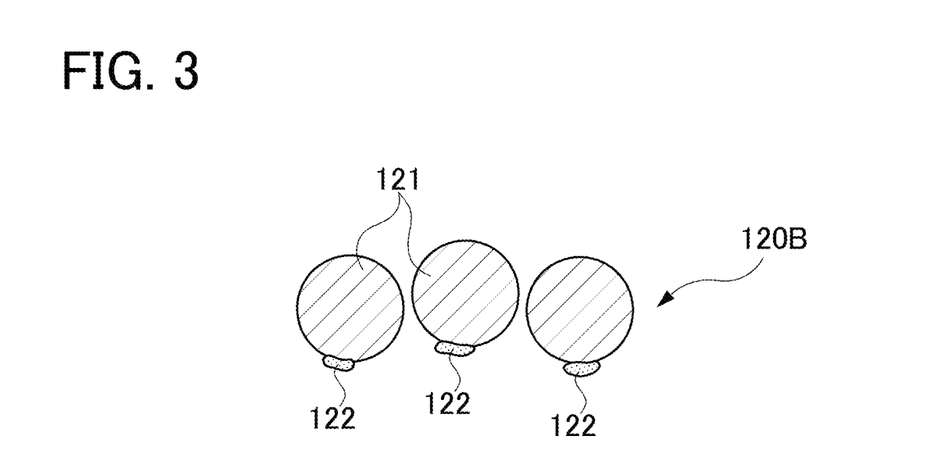
FIG. 3 is an enlarged view of a part C in FIG. 1.

To be more specific, in the electrode layer 120 of the negative electrode plate 100 according to the present embodiment, a plurality of the active material particles 121 are bound to one another by the binder particles 122 having the smaller diameters than the active material particles 121. As it is clear by comparing FIG. 2 and FIG. 3, in this electrode layer 120, the number of the binder particles 122 existing around the active material particles 121 included in the second electrode layer 120B (the layer constituting the surface 125 of the electrode layer 120) is less than the number of the binder particles 122 existing around the active material particles 121 included in the first electrode layer 120A (the layer placed on the side of the current collecting foil 110). Specifically, the number of the binder particles 122 adhering to the surfaces of the active material particles 121 in the second electrode layer 120B is less than the number of the binder particles 122 adhering to the surfaces of the active material particles 121 in the first electrode layer 120A (the layer placed on the side of the current collecting foil 110). Herein, FIG. 2 is an enlarged view of a part B in FIG. 1 and an enlarged sectional view of the first electrode layer 120A. Further, FIG. 3 is an enlarged view of a part C in FIG. 1 and an enlarged sectional view of the second electrode layer 120B.

In this manner, the number of the binder particles 122 existing around the active material particles 121 on the surface 125 of the electrode layer 120 is reduced, so that the charge and discharge characteristics of the lithium-ion secondary battery is improved. Specifically, there are less binder particles 122 which obstruct coming in and out (insertion and detachment) of the lithium ions around the active material particles 121 (the surface of the active material particles 121) existing on the surface 125 of the electrode layer 120, and accordingly, the lithium ions are easy to come in and out (insertion and detachment) of the surface 125 of the electrode layer 120. As a result of this, the charge and discharge characteristics of the lithium-ion secondary battery is improved.

Figure 4:
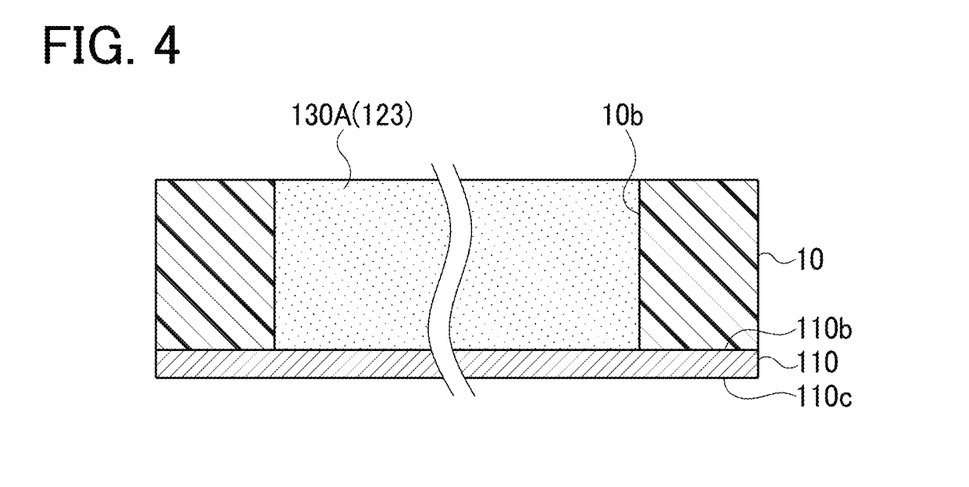
FIG. 4 is an explanatory view for explaining a manufacturing method for the electrode plate in the embodiment.
Figure 8:
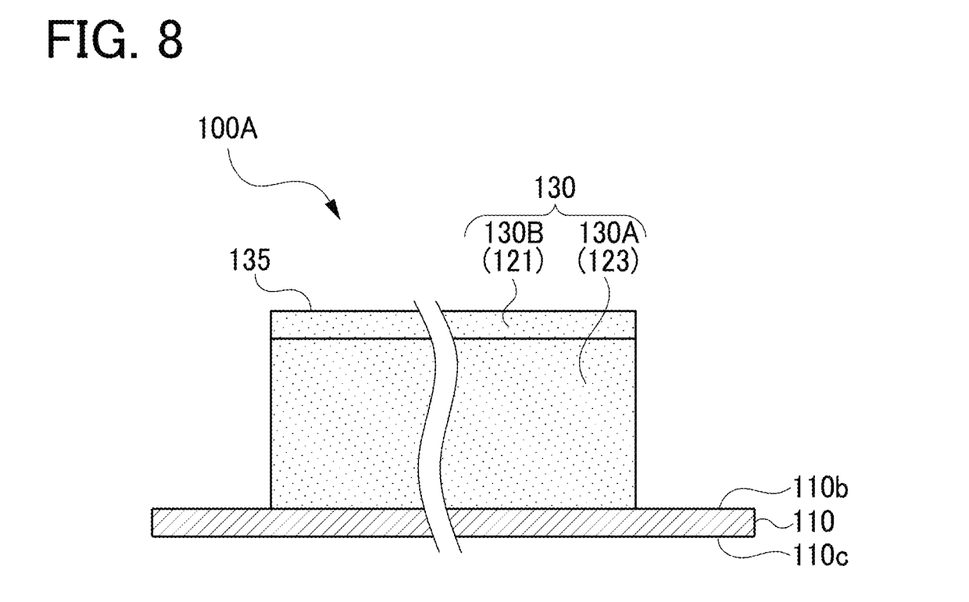
FIG. 8 is another explanatory view for explaining the manufacturing method for the electrode plate in the embodiment.

Next, a manufacturing method for the negative electrode plate 100 according to the embodiment is explained. In the deposition-layer forming process (deposition-layer forming), the deposition layer 130, in which the active material particles 121 and the binder particles 122 are deposited and no solvent ins included (see FIG. 8), is formed on the surface (the first surface 110b) of the current collecting foil 110. Specifically, the current collecting foil 110 made of a copper foil with a thickness of 8 μm is prepared, and as shown in FIG. 4, a resin plate 10, which is of a thickness of 1 mm and has a through hole 10b of a diameter of 25 mm, is placed on the first surface 110b of the current collecting foil 110.

Figure 5:
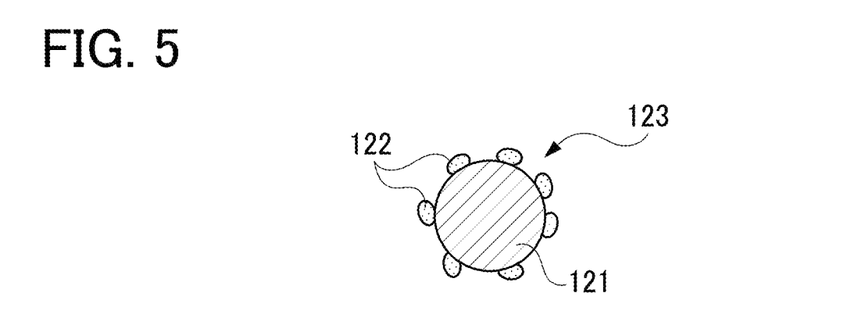
FIG. 5 is a schematic sectional view of a first composite particle.

Subsequently, a plurality of first composite particles 123 are put (fill up) into the through hole 10b of the resin plate 10 to form the first deposition layer 130A formed of a plurality of the first composite particles 123 on the first surface 110b of the current collecting foil 110 (see FIG. 4). Herein, the first composite particle 123 includes no solvent (liquid) and is formed of a particle in which the binder particles 122 having smaller diameter than the active material particles 121 are bound to the surface of the active material particle 121 as shown in FIG. 5. In the present embodiment, a graphite particle having a particle diameter of 10 μm (for example, an amorphous carbon coated graphite particle) is used as the active material particle 121. Further, PVDF particles each having a diameter of 100 to 200 nm are used as the binder particles 11. The first composite particles 123 are, for example, obtained by agitating and mixing the active material particles 121 and the binder particles 122 so that a plurality of the binder particles 122 are bound to the surfaces of the respective active material particles 121.

Figure 6:
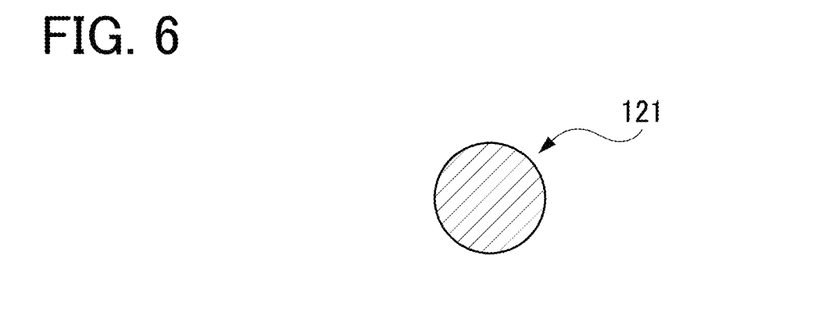
FIG. 6 is a schematic sectional view of an active material particle.
Figure 7:
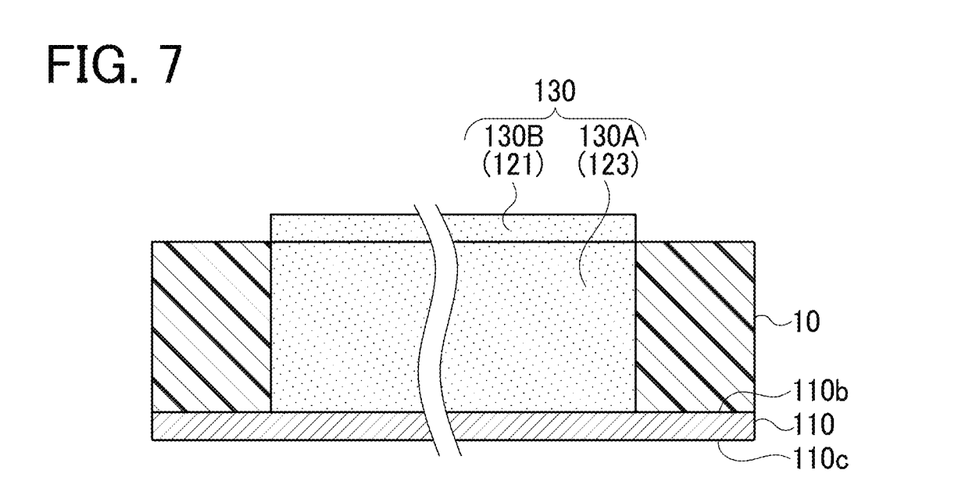
FIG. 7 is another explanatory view for explaining the manufacturing method for the electrode plate in the embodiment.

Subsequently, as shown in FIG. 7, a plurality of the active material particles 121 (the active material particles 121 to which no binder particles 122 are bound, see FIG. 6) are dusted over the surface of the first deposition layer 130A to form the second deposition layer 130B formed of a plurality of the active material particles 121 on the surface of the first deposition layer 130A. Thus, the deposition layer 130, in which the active material particles 121 and the binder particles 122 are deposited and no solvent is included, is formed on the surface 110b of the current collecting foil 110 (see FIG. 7). The deposition layer 130 includes the first deposition layer 130A placed on the side of the current collecting foil 110 and the second deposition layer 130B constituting the surface 135 of the deposition layer 130.

Herein, in the present embodiment, the first deposition layer 130A is a layer contacted with the surface (the first surface 110b) of the current collecting foil 110, and the second deposition layer 130B is a layer deposited on the surface of the first deposition layer 130A. Further, in the present embodiment, a thickness of the first deposition layer 130A is set as 1.0 mm, and a thickness of the second deposition layer 130B is set as 10 to 20 μm. The resin plate 10 is the one to be removed later, and by removing the resin plate 10, the deposition-layer-formed current collecting foil 100A having the deposition layer 130 on the first surface 110b of the current collecting foil 110 is obtained (see FIG. 8).

Incidentally, in the present embodiment, the first deposition layer 130A is formed by a plurality of the first composite particles 123 (the particles in which the binder particles 122 are bound to the surface of the respective active material particles 121), and the second deposition layer 130B is formed by a plurality of the active material particles 121 (the active material particles 121 to which no binder particles 122 are bound) as mentioned above. Accordingly, in the present embodiment, in the deposition-layer forming process, the deposition layer 130 is formed in a manner that the content rate of the binder particles 122 in the second deposition layer 130B (the layer constituting the surface 135 of the deposition layer 130) is lower than the content rate of the binder particles 122 in the first deposition layer 130A (the layer placed on the side of the current collecting foil 110).

Figure 9:
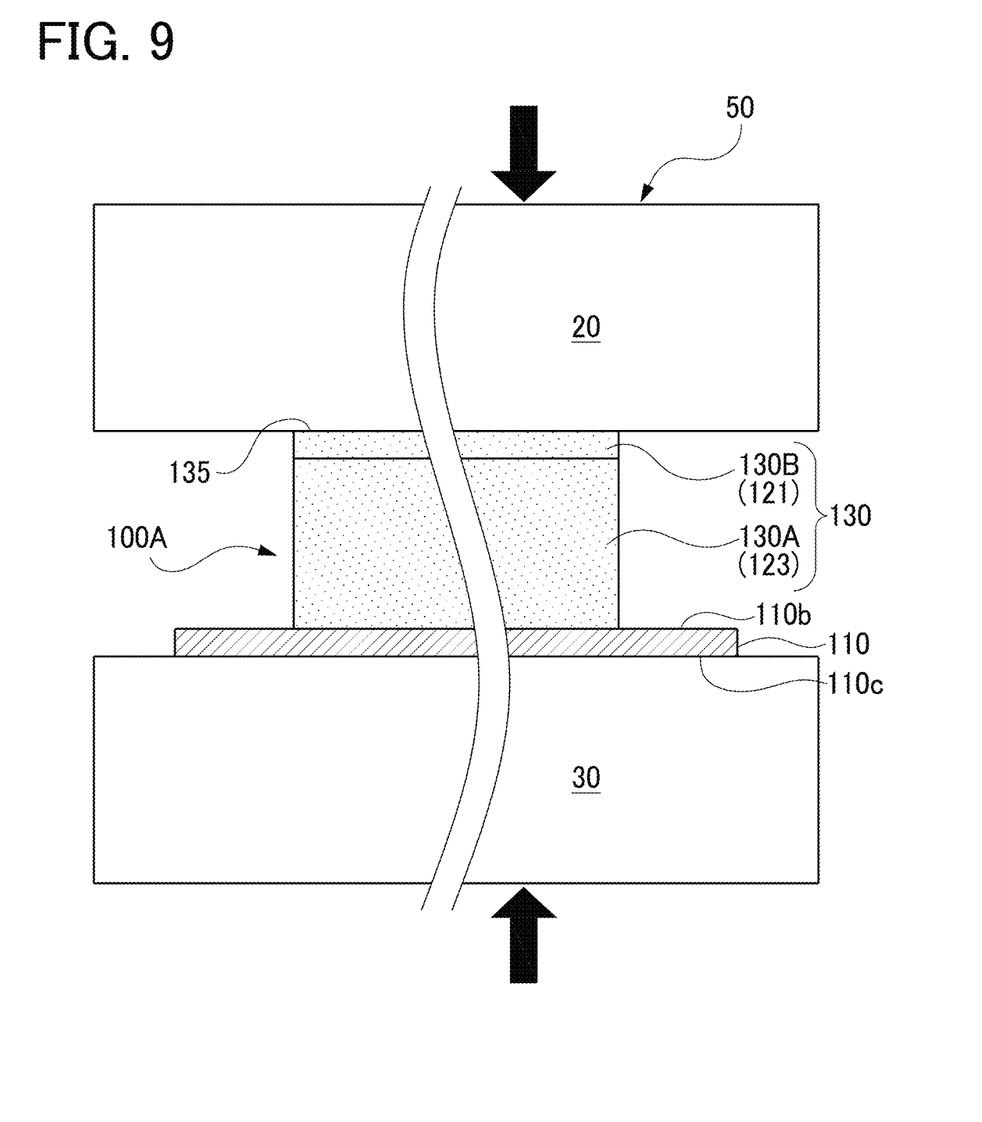
FIG. 9 is another explanatory view for explaining the manufacturing method for the electrode plate in the embodiment.

After that, in the heat pressing process (heat pressing), the deposition-layer-formed current collecting foil 100A having the deposition layer 130 on the first surface 110b of the current collecting foil 110 is heated and compressed in a thickness direction by a pair of heat press portions (a first heating plate 20 and a second heating plate 30) of a heat pressing device 50 to form the electrode layer 120 on the first surface 110b of the current collecting foil 110 (see FIG. 9). In more detail, the first heating plate 20 is made to be in contact with the surface 135 of the deposition layer 130 and the second heating plate 30 is made to be in contact with the second surface 110c of the current collecting foil 110, and in this state, the deposition-layer-formed current collecting foil 100A is held between the first heating plate 20 and the second heating plate 30 to heat and compress the deposition-layer-formed current collecting foil 100A in the thickness direction.

In the present embodiment, each temperature of the first heating plate 20 and the second heating plate 30 is set as 180° C. The deposition-layer-formed current collecting foil 100A is heated and compressed in the thickness direction by applying a compression load of 5 tons to the deposition-layer-formed current collecting foil 100A by these first heating plate 20 and the second heating plate 30.

In this heat pressing process, the deposition layer 130 is compressed in the thickness direction (in an upper and lower direction in FIG. 9) and the binder particles 122 included in the deposition layer 130 are softened or molten. By the thus softened or molten binder particles 122, the active material particles 121 are bound to one another and the deposition layer 130 is bound to the first surface 110b of the current collecting foil 110. As a result of this, the deposition layer 130 becomes the electrode layer 120, and this electrode layer 120 is formed on the first surface 110b of the current collecting foil 110, and thereby the negative electrode plate 110 shown in FIG. 1 is manufactured.

In the manufacturing method of the present embodiment, in the deposition-layer forming process, the deposition layer 130 is formed in a manner that the content rate of the binder particles 122 in the second deposition layer 130B (the layer constituting the surface 135 of the deposition layer 130) is lower than the content rate of the binder particles 123 in the first deposition layer 130A (the layer placed on the side of the current collecting foil 110). Accordingly, in the following heat pressing process, the second deposition layer 130B of the deposition layer 130, which is relatively low in the content rate of the binder particles 122, is to be in contact with the heat press portion (the first heating plate 20 in the present embodiment). Accordingly, the surface 135 of the deposition layer 130 is hard to adhere (stick) to the heat press portion (the first heating plate 20) in the heat pressing process, so that it is possible to reduce the problem that "a part of the electrode layer 120 is detached (peeled off) from the surface of the current collecting foil 110 and sticks to the heat press portion (the first heating plate 20) of the heat pressing device 50."

More particularly, in the deposition-layer forming process of the manufacturing method of the present embodiment, as the first deposition layer 130A, the one formed of the first composite particles 123, in which a plurality of the binder particles 122 are bound to the surface of the active material particle 121, is formed. Further, as the second deposition layer 130B, the one formed of a plurality of the active material particles 121 (the active material particles 121 to which no binder particles 122 are bound) is formed. Accordingly, the number (the amount) of the binder particles 122 existing around the active material particles 121 in the second deposition layer 130B is less than the number (the amount) of the binder particles 122 existing around the active material particles 121 in the first deposition layer 130A.

Therefore, in the heat pressing process, the second deposition layer 130B of the deposition layer 130 including relatively less number (amount) of the binder particles 122 around the active material particles 121 is to be in contact with the heat press portion (the first heating plate 20). Thus, in the heat pressing process, the active material particles 121 contacted with the heat press portion (the first heating plate 20) are hard to adhere (stick) to the heat press portion (the first heating plate 20), so that it is possible to reduce the problem that "a part of the electrode layer 120 is detached (peeled off) from the surface of the current collecting foil 110 and sticks to the heat press portion (the first heating plate 20)."

The negative electrode plate 100 manufactured as mentioned above is thereafter combined with a positive electrode plate and a separator to form an electrode body. Then, after attaching a terminal member to this electrode body, the electrode body and an electrolyte are accommodated in a battery case. A lithium-ion secondary battery is thus completed.

<Evaluation of Manufacturing Method>

Four negative electrode plates 100 are manufactured by the manufacturing method of the above-mentioned embodiment. In any one of those manufactured negative electrode plates 100, there is occurred no problem that "a part of the electrode layer 120 is detached (peeled off) from the surface of the current collecting foil 110 and sticks (is transferred) to the heat press portion (the first heating plate 20)."

On the other hand, other four negative electrode plates are manufactured by a manufacturing method of a comparative embodiment. In a deposition-layer forming process of this comparative embodiment, a deposition layer is formed on a first surface 110b of a current collecting foil 110 only by first composite particles 123 in which a plurality of binder particles 122 are bound to surfaces of active material particles 121. In this manner, the deposition layer is formed such that a content rate of binder particles 122 in a second deposition layer (a layer constituting a surface of the deposition layer) is similar to a content rate of the binder particles 122 in a first deposition layer (the layer placed on a side of the current collecting foil 110).

Accordingly, in the comparative embodiment, the content rate of the binder particles 122 in the second deposition layer constituting the surface of the deposition layer is higher than that in the present embodiment. Specifically, in the comparative embodiment, the number (the amount) of the binder particles 122 existing around the active material particles 121 in the second deposition layer 130B is larger than that in the present embodiment. Subsequently, the heat pressing process as similar to the present embodiment is carried out to manufacture the four negative electrode plates. When three of the thus manufactured four negative electrode plates are manufactured, there is occurred the problem that "a part of the electrode layer 120 is detached (peeled off) from the surface of the current collecting foil 110 and sticks (is transferred) to the heat press portion (the first heating plate 20)."

From the above result, the manufacturing method of the present embodiment can achieve reduction in the problem that "a part of the electrode layer 120 is detached (peeled off) from the surface of the current collecting foil 110 and sticks (is transferred) to the heat press portion (the first heating plate 20)." The reason for this achievement in the present embodiment is because, in the deposition-layer forming process, the deposition layer 130 is formed such that the content rate of the binder particles 122 in the second deposition layer 130B (the layer constituting the surface 135 of the deposition layer 130) is lower than the content rate of the binder particles 122 in the first deposition layer 130A (the layer placed on the side of the current collecting foil 110) which is different from the comparative embodiment.

Further, the negative electrode plate 100 manufactured by the manufacturing method of the present embodiment can improve the charge and discharge characteristics of a lithium-ion secondary battery as compared with the negative electrode plate manufactured by the manufacturing method of the comparative embodiment. This is because the negative electrode plate 100 manufactured by the manufacturing method of the present embodiment is configured such that the content rate of the binder particles 122 in the electrode layer 120 is lower in the second electrode layer 120B constituting the surface 125 of the electrode layer 120 than in the first electrode layer 120A placed on the side of the current collecting foil 110. Accordingly, lithium ions are easy to come in and out (insertion and detachment) of the surface 125 of the electrode layer 120, so that the charge and discharge characteristics of the lithium-ion secondary battery is improved.

The present disclosure has been explained with the embodiment as mentioned above, but the present disclosure is not limited to the above-mentioned embodiment and may naturally be adapted with appropriate modifications without departing from the scope of the disclosure.

For example, in the present embodiment, the manufacturing method for the negative electrode plate 100 is exemplified as a manufacturing method for an electrode plate. However, the present disclosure may be applied to a manufacturing method for a positive electrode plate not only for the negative electrode plate. When manufacturing the positive electrode plate, as a first composite particle, a composite particle in which binder particles and conductive particles are bound to a surface of an active material particle is preferably used.

Further, the present embodiment exemplifies formation of the electrode layer 120 only on one surface (the first surface 110b) of the current collecting foil 110, but alternatively, the electrode layer 120 may be formed on both surfaces (the first surface 110b and the second surface 110c) of the current collecting foil 110. Namely, the present disclosure can be applied not only to an electrode plate having an electrode layer on one surface (a first surface) of a current collecting foil but also to an electrode plate having electrode layers on both surfaces (the first surface and a second surface) of the current collecting foil and to a manufacturing method thereof. When the electrode layers 120 are to be formed on both surfaces of the current collecting foil 110, as mentioned above, the deposition layer 130 is formed on the first surface 110b of the current collecting foil 110 in the deposition-layer forming process and a one-side laminated electrode plate having the electrode layer 120 on the first surface 110b of the current collecting foil 110 is fabricated by carrying out the heat pressing process. Thereafter, the deposition layer 130 is further formed on the second surface 110c of the current collecting foil 110 of the thus formed one-side laminated electrode plate, and then the heat pressing process may be carried out.

Further, in the present embodiment, a strip-shaped current collecting foil 110 which has been cut into a rectangular shape is utilized as a current collecting foil, and the leaf-shaped (strip-shaped) negative electrode plate 100 is fabricated by use of the heat pressing device 50 including a pair of heating plates (the first heating plate 20 and the second heating plate 30) as a pair of heat pressing portions. However, alternatively, the present disclosure may be applied to a case of manufacturing a long strip-shaped negative electrode plate by use of a heat pressing device having a pair of heating rollers (a first heating roller and a second heating roller) as a pair of the heat press portions by preparing a long strip-shaped current collecting foil as the current collecting foil. For example, the deposition layer (the first deposition layer and the second deposition layer) is formed on the surface of the current collecting foil while the long strip-shaped current collecting foil is being conveyed in a longitudinal direction, and thereafter, the heat pressing process may be carried out by a pair of the heating rollers.

Further, in the present embodiment, the second deposition layer 130B formed of the active material particles 121 is formed as the second deposition layer. Alternatively, in the present disclosure, as the second deposition layer, a second deposition layer may be formed of second composite particles (a plurality of second composite particles) in which the binder particles 122 less than those included in the first composite particle 123 are bound to the surfaces of the active material particles 121. Further alternatively, the second deposition layer may be formed of a plurality of the active material particles 121 and a plurality of the second composite particles.

REFERENCE SIGNS LIST

20 First heating plate (heat press portion)
30 Second heating plate (heat press portion)
50 Heat pressing device
100 Negative electrode plate (electrode plate)
100A Deposition-layer-formed current collecting foil
110 Current collecting foil
110b First surface (surface)
120 Electrode layer
120A First electrode layer
120B Second electrode layer
125 Surface
121 Active material particle
122 Binder particle
123 First composite particle
130 Deposition layer
130A First deposition layer
130B Second deposition layer

What is claimed is:

1. A method of manufacturing an electrode plate including an electrode layer on a surface of a current collecting foil, the method comprising:
   deposition-layer forming of forming a deposition layer, in which a plurality of active material particles and a plurality of binder particles are deposited and no solvent is included, on the surface of the current collecting foil; and
   heat pressing of forming the electrode layer on the surface of the current collecting foil by heating and compressing a deposition-layer-formed current collecting foil, in which the deposition layer exists on the surface of the current collecting foil, by a pair of heat press portions of a heat pressing device, wherein
   the deposition-layer forming includes: before the heat pressing,
      forming a first deposition layer placed on a side of the current collecting foil and having the active material particles and the binder particles; and
      forming a second deposition layer constituting a surface of the deposition layer,
   in the forming of the second deposition layer, the active material particles with no binder particles are directly deposited on the first deposition layer,
   the second deposition layer is formed to have a thickness of 10 to 20 μm on the first deposition layer, and
   the second deposition layer is thinner than the first deposition layer.

2. The method according to claim 1, wherein in the heat pressing, the second deposition layer, which has no binder particles, is in direct contact with one of the pair of heat press portions.

3. The method according to claim 1, wherein a temperature of each of the pair of heat press portions of the heat pressing device is 180° C. in the heat pressing.

* * * * *